US009540580B2

(12) United States Patent
Van Thorre et al.

(10) Patent No.: US 9,540,580 B2
(45) Date of Patent: Jan. 10, 2017

(54) CHAR MADE WITH A MICROWAVE-TRANSPARENT REACTION CHAMBER FOR PRODUCTION OF FUEL FROM AN ORGANIC-CARBON-CONTAINING FEEDSTOCK

(71) Applicants: Douglas M. Van Thorre, Minneapolis, MN (US); Michael L. Catto, Moore, SC (US)

(72) Inventors: Douglas M. Van Thorre, Minneapolis, MN (US); Michael L. Catto, Moore, SC (US)

(73) Assignee: TEKGAR, LLV, Moore, SC (US)

( * ) Notice: Subject to any disclaimer, the term of this patent is extended or adjusted under 35 U.S.C. 154(b) by 387 days.

(21) Appl. No.: 14/076,200

(22) Filed: Nov. 9, 2013

(65) Prior Publication Data

US 2014/0208639 A1 Jul. 31, 2014

Related U.S. Application Data

(63) Continuation-in-part of application No. 13/751,677, filed on Jan. 28, 2013, now abandoned.

(51) Int. Cl.
*C10B 31/00* (2006.01)
*C10L 5/44* (2006.01)
(Continued)

(52) U.S. Cl.
CPC ................ *C10L 5/447* (2013.01); *B01J 8/087* (2013.01); *B01J 8/10* (2013.01); *B01J 19/126* (2013.01);
(Continued)

(58) Field of Classification Search
CPC ............. B01J 19/126; B01J 8/087; B01J 8/10; C10B 19/00; C10B 23/00; C10G 1/00; C10G 1/02; C10G 1/10; C10L 5/28; C10L 5/42; C10L 5/447
(Continued)

(56) References Cited

U.S. PATENT DOCUMENTS 3,858,329 A 1/1975 Koide et al.
3,867,606 A 2/1975 Peterson
(Continued)

OTHER PUBLICATIONS

Abdulrazzaq, H., et al., Biochar from Empty Fruit Bunches, Wood, and Rice Husks: Effects on Soil Physical Properties and Growth of Sweet Corn on Acidic Soil, Journal of Agricultural Science, vol. 7 (1) (2015), pp. 192-200.
(Continued)

*Primary Examiner* — Nina Bhat
(74) *Attorney, Agent, or Firm* — Berggren Law Offices, LLC; William R. Berggren; Stephen F. Wolf

(57) ABSTRACT

A char composition made by an oxygen-starved microwave process from an organic-carbon-containing feedstock is described. Feedstock is introduced into a substantially microwave-transparent reaction chamber. A microwave source emits microwaves which are directed through the microwave-transparent wall of the reaction chamber to impinge on the feedstock within the reaction chamber. The microwave source may be rotated relative to the reaction chamber. The feedstock is subjected to microwaves until the desired reaction occurs to produce a fuel. A catalyst can be mixed with the feedstock to enhance the reaction process.

10 Claims, 9 Drawing Sheets

610 — Input carbon-containing feedstock into microwave transparent reaction chamber 620 — Direct microwaves through the walls of the microwave transparent reaction chamber 630 — Heat/irradiate the feedstock via the microwaves until depletion of the feedstock 640 — Collect the products yielded by the feedstock.

(51) Int. Cl.

| | |
|---|---|
| ***C10L 5/28*** | (2006.01) |
| ***C10L 5/42*** | (2006.01) |
| ***B01J 19/12*** | (2006.01) |
| ***C10G 1/02*** | (2006.01) |
| ***C10G 1/10*** | (2006.01) |
| ***B01J 8/08*** | (2006.01) |
| ***B01J 8/10*** | (2006.01) |

(52) U.S. Cl.
CPC . *C10G 1/02* (2013.01); *C10G 1/10* (2013.01); *C10L 5/28* (2013.01); *C10L 5/42* (2013.01); *B01J 2208/00442* (2013.01); *B01J 2219/00006* (2013.01); *Y02E 50/10* (2013.01); *Y02E 50/30* (2013.01)

(58) Field of Classification Search
USPC ..... 201/19, 2.5, 25; 202/105, 117, 131, 136, 202/218, 249; 219/700; 585/240, 241, 242, 16; 208/402; 423/445 R, 449.7, 449.8, 461, 423/414; 422/186.29; 44/605, 606, 307
See application file for complete search history.

(56) References Cited

U.S. PATENT DOCUMENTS 3,916,137 A 10/1975 Jurgensen
4,121,078 A 10/1978 Takano et al.
4,326,114 A 4/1982 Gierling et al.
4,459,450 A 7/1984 Tyler et al.
4,565,670 A 1/1986 Miyazaki et al.
4,631,380 A 12/1986 Tran
5,242,663 A 9/1993 Shiomi et al.
5,366,595 A * 11/1994 Padgett .................. C10B 19/00 201/19
5,902,510 A * 5/1999 Balbaa .................... H05B 6/78 219/700
5,946,816 A 9/1999 Smith
6,398,921 B1 6/2002 Moraski
2010/0069688 A1 3/2010 Pringle et al.
2010/0258429 A1 10/2010 Ugolin
2011/0036706 A1 2/2011 Van Thorre et al.
2011/0312485 A1 12/2011 Hashisho et al.
2015/0083571 A1 3/2015 Catto et al.

OTHER PUBLICATIONS

Mohan, D. et al., “Pyrolysis of Wood/Biomass for Bio-oil: A Critical Review”, Energy & Fuels, vol. 20 (2006), pp. 848-889.

Jahirul, M. I., et al., Biofuels Production through Biomass Pyrolysis—A Technological Review, Energies, vol. 5 (2012), pp. 4952-5001.

Sadaka, S., at al., “Pyrolysis and Bio-oil”, University of Arkansas, United States Department of Argiculture, publication FSA1052 (2014).

Hardie, M., et al., “Does Biochar Influence Soil Physical Properties and Soil Water Availability?”, Tasmanian Institute of Agriculture Paper of the Month, Monday 24, 2014, available online at www.tia.tas.edu.au.

Zacher, A., et al., “Direct Thermochemical Liquifaction”, IEA Bioenergy Task 34, Jan. 2016.

* cited by examiner

CHAR MADE WITH A MICROWAVE-TRANSPARENT REACTION CHAMBER FOR PRODUCTION OF FUEL FROM AN ORGANIC-CARBON-CONTAINING FEEDSTOCK

RELATED APPLICATION

This application claims the benefit of Provisional Patent Application Ser. No. 61/233,694, filed on Aug. 13, 2009, U.S. Pat. No. 8,361,282, filed on Aug. 11, 2010 and issued on Jan. 29, 2013, and U.S. patent application Ser. No. 13/751,677, filed on Jan. 28, 2013 to which priority is claimed pursuant to 35 U.S.C. §119(e) and which is hereby incorporated herein by reference.

FIELD OF THE INVENTION

The present invention relates generally to the production of solid char fuel from an organic-carbon-containing feedstock.

BACKGROUND OF THE INVENTION

The vast majority of fuels are distilled from crude oil pumped from limited underground reserves. As the earth's crude oil supplies are depleted, the world-wide demand for energy is simultaneously growing. Over the next ten years, depletion of the remaining world's easily accessible crude oil reserves will lead to a significant increase in cost for fuel obtained from crude oil.

The search to find processes that can efficiently convert industrial waste, depleteable materials, and renewable materials to fuels and by products suitable for transportation and/or heating is an important factor in meeting the ever-increasing demand for energy. In addition, processes that have solid byproducts that have improved utility are also increasingly in demand.

Solid byproducts by process that have more beneficial properties are an important factor in meeting the ever-increasing demand for energy and food. The present invention fulfills these needs and provides various advantages over the prior art.

SUMMARY OF THE INVENTION

A char composition made from an organic-carbon-containing feedstock that passes through a microwave process system is described. The system includes at least one reaction chamber within a microwave-reflective enclosure. The reactive chamber includes at least one microwave-transparent chamber wall and at least one reaction cavity within the reaction chamber configured to hold the organic-carbon-containing feedstock in an externally supplied oxygen free atmosphere. A microwave subsystem includes at least one device configured to emit microwaves when energized. The microwave device is positioned relative to the reaction chamber so that the microwaves are directed through the microwave-transparent chamber wall and into the reaction cavity. The system also includes a mechanism that provides relative motion between the microwave device and the reaction chamber. The char composition includes substantially no free water. Also the char composition includes pores that have a variance in pore size of less than 10 percent.

In another embodiment, the char composition of the invention involves a microwave process for converting an organic-carbon-containing compound to fuel and char. An organic-carbon-containing feedstock is input into a substantially microwave-transparent reaction chamber containing no externally supplied oxygen and within a microwave reflective enclosure. Microwaves are directed from a microwave source through walls of the reaction chamber to impinge on the feedstock. Relative motion is provided between the microwave-transparent reaction chamber and the microwave source. The feedstock is microwaved until it reacts to produce a fuel and the char composition.

The above summary is not intended to describe the char in every detail. Characteristics and benefits over known char made by the thermal processing of the same organic-carbon-containing feedstocks, together with a more complete understanding of the invention, will become apparent and appreciated by referring to the following detailed description and claims taken in conjunction with the accompanying drawings.

As used herein:

"BioChar" means "char" made by "renewable material feedstock" processed in the microwave system as described in this document.

"Organic-carbon-containing feedstock" means "renewable material feedstock" and "unrenewable material feedstock" containing organic carbon.

"Char" means the solid product of the devolitization of "organic-carbon-containing feedstock" processed in the microwave system as described in this document.

"Renewable material feedstock" means organic-carbon-containing feedstock from plant or animal material that can be renewed in less than 50 years, and includes such materials as, for example, grasses, agricultural plant waste, tree parts, and animal manure.

"Unrenewable material feedstock" means hydrocarbon-containing feedstock that includes manufactured material and depletable plant and animal material that cannot be renewed in less than 50 years, and includes such materials as, for example, rubber such as tire crumbs, plastics, municipal waste, crude oil, peat, and coal such as bituminous coal, and anthracite coal

Figure 1A:
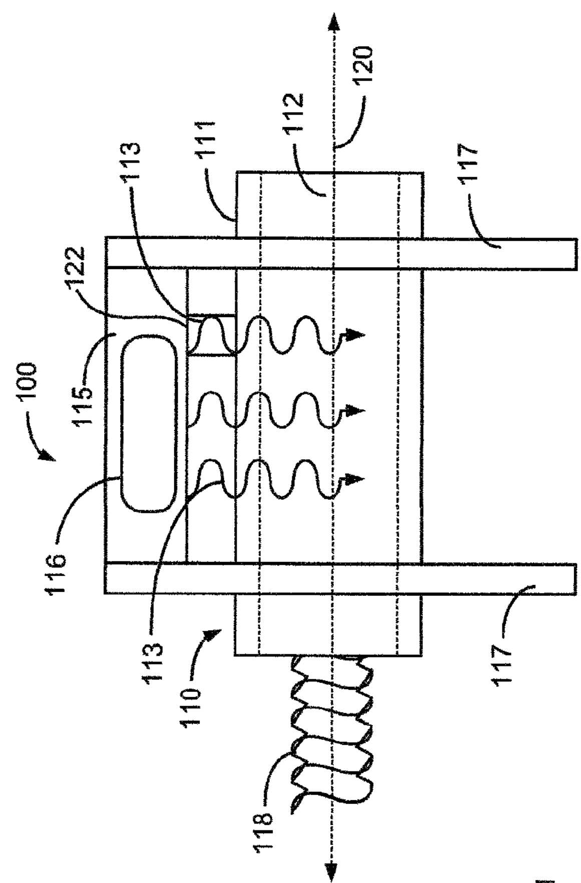
FIGS. 1A and 1B illustrate side and cross sectional views, respectively, of a system configured to convert organic-carbon-containing materials to char in accordance with embodiments of the invention.

While the invention is amenable to various modifications and alternative forms of the process, specifics thereof have been shown by way of example in the drawings and will be described in detail below. It is to be understood, however, that the intention is not to limit the invention to the particular process embodiments described. On the contrary, the invention is intended to cover product from all modifications, equivalents, and alternatives falling within the scope of the invention as defined by the appended claims.

DETAILED DESCRIPTION OF VARIOUS EMBODIMENTS

As used in this document, char is the solid product of the devolitization of organic-carbon-containing feedstocks. For coal, char is the solid material that remains after light gases and tar have been driven out or released from a carbonaceous material during the initial stage of an oxygen-starved combustion, also known as carbonization, charring, devolatization, or pyrolysis. Light gases include, for example, coal gas, a flammable gaseous fuel that contains a variety of calorific gases including hydrogen, carbon monoxide, methane and volatile hydrocarbons together with small quantities of non-calorific gases such as carbon dioxide and nitrogen. Coal tar is a brown or black liquid of extremely high viscosity that include complex and variable mixtures of phenols, polycyclic aromatic hydrocarbons (PAHs), and heterocyclic compounds. In contrast, combustion in the presence of oxygen (with or without char deposits) is known as gasification and is used to make such products as syngas and typically produces ash rather than char. This type of combustion ends quickly upon the reaching of reversible gas phase, water gas shift reaction, a reversible chemical reaction in which carbon monoxide reacts with water vapor to form carbon dioxide and hydrogen (the mixture of carbon monoxide and hydrogen is known as syngas).

Char from the decomposition of organic-carbon-containing feedstocks other than coal has similar properties that differ somewhat based on the feedstock used. Some other chars include, for example, char made by the pyrolysis of biomass, also known as charcoal. Charcoal has various uses including, for example, a combustible fuel for generating heat for cooking and heating, as well as a soil amendment to supply minerals for fertilizing soils used for growing agricultural and horticultural products. Char has also been made with passing biomass through an open microwave oven similar to a bacon cooker that is exposed to the external atmosphere containing oxygen and contains pores with a variance similar to that made by a thermal process that has a liquid phase.

In char made by thermal heat or infrared radiation (IR), the radiation is absorbed on the surface of any organic-carbon-containing feedstock and then is re-radiated to the next level at a lower temperature. This process is repeated over and over again until the IR radiation penetrates to the inner most part of the feedstock. All the material in the feedstock absorbs the IR radiation at its surfaces and different materials that make up the feedstock absorb the IR at different rates. A delta temperature of several orders of magnitude can exist between the surface and the inner most layers or regions of the feedstock. As a result, the solid organic-carbon-containing feedstock locally passes through a liquid phase before it is volatilized. This variation in temperature may appear in a longitudinal direction as well as radial direction depending on the characteristics of the feedstock, the rate of heating, and the localization of the heat source. This variable heat transfer from the surface to the interior of the feedstock can cause cold and hot spots, thermal shocks, uneven surface and internal expansion cracks, fragmentation, eject surface material and create aerosols. All of this can result in microenvironments that cause side reactions with the creation of many different end products. These side reactions are not only created in the feedstock but also in the volatiles that evaporate from the feedstock and occupy the vapor space in the internal reactor environment before being collected.

A common IR radiation process, pyrolysis, produces biochar, liquids, and gases from biomass by heating the biomass in a low/no oxygen environment. The absence of oxygen prevents combustion. The relative yield of products from pyrolysis varies with temperature. Temperatures of 400-500° C. (752-932° F.) produce more char, while temperatures above 700° C. (1,292° F.) favor the yield of liquid and gas fuel components. Pyrolysis occurs more quickly at the higher temperatures, typically requiring seconds instead of hours. Typical yields are 60% bio-oil, 20% biochar, and 20% syngas. High temperature pyrolysis is also known as gasification, and produces primarily syngas. By comparison, slow pyrolysis can produce substantially more char, on the order of about 50%.

In contrast, the process to make the char of the invention uses microwave radiation from the oxygen-starved microwave process system described herein. With microwave radiation, almost all of the feedstock is nearly transparent to the microwave radiation. Most of the microwave radiation just passes through the entire feedstock because it isn't absorbed. Almost all materials are nearly transparent to microwave radiation except water molecules and other similar molecular bonds to water. So any feedstock subjected to the microwave radiation field is exposed to the radiation evenly, inside to outside, no matter what the physical dimensions and content of the feedstock. With microwaves, the radiation is preferentially absorbed by water molecules that then vibrate and heat up. The water molecules have so much entropy that the microwaves are selectively absorbed by the water. This heat is then transferred to the surrounding environment resulting in the feedstock being evenly and thoroughly heated.

When the water is all evaporated then some of the microwaves start to be absorbed by the remaining feedstock and heat up within a reflecting enclosure that cause the microwave radiation to pass through the feedstock numerous times. Microwave radiation can complete the conversion of feedstock at lower temperatures than IR and shorter timeframes. Operating temperature reductions may range from 10-30% lower and heating times may be reduced from by a quantity equal to one-half to one-tenth of that needed by IR radiation to accomplish a similar degree of decomposition of a specified feedstock. All this can result in an evenly heated feedstock from the inside out so there are reduced microenvironments, less side reactions and cleaner volatiles to collect.

The atmosphere in the reaction chamber is free of externally supplied oxygen. In some embodiments, the atmosphere is inert, such as, for example, nitrogen. In some embodiments, the atmosphere may contain a small amount of water that previously had not been completely removed from the organic-carbon-containing feedstock being processed before it entered the reaction chamber.

The resulting char from the microwave process system discussed herein is the devolatilized carbon residue of an irradiated organic-carbon-containing hydrocarbon feedstock. The microwave system discussed herein can process organic-carbon-containing feedstock that does not contain water when it enters the reaction chamber. All organic-carbon-containing feedstocks contain molecules that disassociated in the reaction chamber with the more divalent bonds preferentially adsorbing more microwave energy to create heat. However, the conversion is more efficient, i.e., faster rates and at lower temperatures, when water or water-associated molecules are present. Some efficient conversions occur when the water content in the organic-containing feedstock as it enters the reaction chamber is at least 5 percent by weight and less than 15 percent by weight. Some occur when the water is at least 6 percent by weight and less than 12 percent by weight. For purposes of this document, water includes free water, interstitial water, cellular water, and the water portion that may be combined with other molecules to form hydrated compounds. During the early exposure of the feedstock to the microwaves, the uniform heating of the water throughout the volume of the feedstock particles results in the creation of more numerous and more uniform pores. Because, most organic-carbon-containing feedstocks contain water the below discussion will focus on those feedstocks. However, similar results may occur for those not containing water but less efficiently.

The char made with the microwave radiation of the process has several improved characteristics when compared to a similar feedstock that is processed with IR radiation as discussed above. First, because substantially all of the free water is removed evenly from surface to center and thoroughly during the microwave process, the pore number and pore size are greater and the variance throughout the char is less than for char made with similar feedstock in an IR process. Some embodiments have a pore number of greater than 10%, some have a pore number greater than 20%, some have a pore number greater than 30%, and some have a pore number greater than 40%. Some embodiments have a pore size as measured in average diameter of a pore of greater than 10%, some have a pore size greater than 20%, some have a pore size greater than 30%, and some have a pore size greater than 40%. Some embodiments have a pore number variance of less than 10%, some have a pore number variance of less than 5%. Some embodiments have a pore size variance of less than 10%, and some have a pore size variance of less than 5%. As a result of the increased pore density, size, and distribution, the surface to volume ratio for some embodiments is at least 4 times that for char made from a similar feedstock with an IR process. In some embodiments the surface to volume ratio is increased by at least 6 times, in some at least 8 times, in some at least 10 times, and in some at least 15 times. The reactor conditions of the microwave process system may be controlled to produce a desired pore density, size, and distribution for a specific feedstock. One example of the superior porosity characteristics is that the char has better hydration characteristics in soils than char of the same feedstock by IR.

Second, the char contains less volatiles than that made from a similar feedstock with an IR process. Volatiles present during depolymerization temperatures cause adverse reactions with carbons to form compounds other than the desired liquid fuels and char of the invention. In addition, volatiles in the char reduce the heating content of the char by reducing the fixed carbon in the resulting char. In the invention, the char is thoroughly devolatilized of condensable and non-condensable gases and vapors. In some embodiments, the content of the gases and vapors is reduced by at least 95% by weight, in some embodiments it is reduced by at least 97% by weight, and in some it is reduced by at least 99% by weight versus char made with similar feedstock by IR processing with a volatile content of at least 10% by weight. This is desirable in char applications such as coke for steel making, gasification, and combustion applications such as boilers because of the less content of adverse corrosive compounds in the char of the invention over that of char by IR process.

Third, the char has a higher heating value than that of char made with the same feedstock by an IR process. Because of better devolatization, there are less side reactions with the volatiles and carbon during later use involving combustion of the char as fuel. Thus, a greater degree of fixed carbon can remain in the char of the invention than in the char from similar feedstock processed by an IR process. The fixed carbon content in some embodiments is increased by at least 5% by weight, in some embodiments by at least 10% by weight, in some embodiments by at least 15% by weight, and in some embodiments by at least 20% by weight. This increase in fixed carbon can result in an increase in the heat content of some embodiments of the char of the invention over that of char from the same feedstock but processed by an IR process. Heat content is affected by the type of organic-carbon-containing feedstock used and generally ranges from at least 10,000 Btu/lb (23 MJ/kg) to over 14,000 Btu/lb (33 MJ/kg) compared with less than 6,000 Btu/lb (14 MJ/kg) to less than 10,000 Btu/lb (23 MJ/kg) for similar organic-carbon-containing feedstocks processed with an IR method. In some embodiments, the heat content of the char is increased by at least 20% over char from the same feedstock with an IR process, in some by at least 30%, in some by at least 40%, in some by at least 50%, in some by at least 60%, and by some at least 70%. In addition, because of the reduced amount of volatiles, the char of the invention can burn without visible smoke and with a smaller flame than seen with char made of a similar feedstock by an IR process. For some embodiments, the flame can be at least 5% less, for some embodiments at least 10% less, for some embodiments at least 15% less, for some embodiments at least 20% less, for some embodiments at least 25% less, for some embodiments at least 30% less, for some embodiments at least 35% less, and for some embodiments at least 40% less.

Organic-carbon-containing feedstock can be separated into two categories, nonrenewable and renewable. For purposes of this document, non-renewable feedstock is organic-carbon-containing feedstock that is manufactured material and/or depletable plant and animal material that cannot be renewed in less than 50 years. Some require many decades to renew, some require many centuries to renew, some require many millennia or longer to renew and some may never be renewed because they are manufactured. This category can include such materials as, for example, rubber such as tire crumbs, plastics, municipal waste, crude oil, peat, and coal such as bituminous coal and anthracite coal. Char made from non-renewable feedstock is referred to as char in this document. Renewable feedstock is an organic-carbon-containing feedstock from plant or animal material that can be renewed in less than 50 years. Some can be renewed in less than a few decades, some can be renewed in less than a few years, and some can be renewed in less than a few months. This category can include such materials as, for example, grasses, agricultural plant waste, tree parts, and animal manure. Char made from renewable feedstock is referred to as biochar in this document. Organic-carbon-containing feedstock used to make the char of the invention can contain mixtures of more than one renewable feedstock, mixtures of more than one non-renewable feedstock, or mixtures of both renewable and non-renewable feedstocks.

The composition by process invention comprises a char composition made from an organic-carbon-containing feedstock that passes through a microwave process system is described. The system includes at least one reaction chamber within a microwave reflective enclosure and comprising at least one microwave-transparent chamber wall and a reaction cavity configured to hold the organic-carbon-containing feedstock in an externally supplied oxygen free atmosphere. A microwave subsystem includes at least one device configured to emit microwaves when energized. The microwave device is positioned relative to the reaction chamber so that the microwaves are directed through the microwave-transparent chamber wall and into the reaction cavity. The system also includes a mechanism that provides relative motion between the microwave device and the reaction chamber. The char composition includes substantially no free water. Also the char composition includes a number of pores per volume that is at least 10 percent more than would have been in a char made with the same feedstock but using a thermal process that creates a liquid phase during the process. The characteristics of the feedstock and resulting char have already been discussed above. The microwave process used to make the char of the invention is now discussed.

In the following description of the illustrated embodiments, references are made to the accompanying drawings that help to illustrate various embodiments of the microwave process used to make the char of the invention. It is to be understood that other embodiments of the process may be utilized and structural and functional changes may be made without departing from the scope of the present invention.

The following description relates to approaches for processing solid and/or liquid organic-carbon-containing feedstock into fuels, e.g., diesel fuels, gasoline, kerosene, etc., by microwave enhanced reaction depolymerization processes. Depolymerization, also referred to as "cracking", is a refining process that uses heat to break down (or "crack") hydrocarbon molecules into shorter polymer chains which are useful as fuels. Depolymerization may be enhanced by adding a catalyst to the feedstock which increases the speed of the reaction and/or reduces the temperature and/or the radiation exposure required for the processes. Furthermore, the catalyst, such as zeolite, has a nanostructure which allows only molecules of a certain size to enter the crystalline grid or activate the surface areas of the catalyst and to interact with the catalyst. Thus, the catalyst advantageously is very effective at controlling the product produced by the reaction processes because only substances having a specified chain length may be produced using the catalytic process. Catalytic depolymerization is particularly useful for transforming biomass and other organic-carbon-containing feedstock into fuels useable as transportation or heating fuels.

One aspect of efficient depolymerization is the ability to heat and irradiate the feedstock substantially uniformly to the temperature that is sufficient to cause depolymerization as well as activate the catalyst. Upon depolymerization, long hydrocarbon chains "crack" into shorter chains. Microwave heating has been shown to be particularly useful in heating systems for thermal depolymerization. Heating systems such as flame, steam, and/or electrical resistive heating, heat the feedstock by thermal conduction through the reaction chamber wall. These heating systems operate to heat the feedstock from the outside of the reaction chamber walls to the inside of the feedstock, whereas microwaves heat from the inside of the feedstock toward the reaction chamber walls. Using non-microwave heating sources, the heat is transferred from the heat source outside wall to the inside of the vessel wall that is in direct contact with the feedstock mixture. The heat is then transferred to the surfaces of the feedstock and then transferred, again, through the feedstock until the internal areas of the feedstock are at a temperature near the temperature of the reaction chamber wall.

One problem with this type of external heating is that there are time lags between vessel wall temperature transmission and raising the feedstock temperature that is contained in the center of the vessel as well as the internal area of the feedstock matrix. Mixing the feedstock helps to mitigate these conditions. Still, millions of microenvironments exist within the reactor vessel environment and the feedstock particles themselves. This causes uneven heat distribution within the reaction chamber of varying degrees. These variant temperature gradients cause uncontrollable side reactions to occur as well as degradation of early conversion products that become over-reacted because of the delay in conversion reaction timeliness. It is desirable to produce and retain consistent heating throughout the feedstock and the reaction products so that good conversion economics are achieved and controllable. Microwave heating is an efficient heating method and it also serves to activate catalytic sites.

Embodiments of the invention are directed to a reaction chamber system that can be used to process any organic-carbon-containing feedstock, whether solid and/or liquid, to extract the volatile organic compounds in the feedstock at a temperature range that will produce liquid transportation fuels.

Microwaves are absorbed by the water molecules in the material that is irradiated in the microwave. When the water molecules absorb the microwaves, the molecules vibrate, which creates heat by friction, and the heat is convected to the surrounding material.

The reason microwaves are absorbed by water molecules is specific to the covalent bonds that attach the hydrogen to the oxygen in a water molecule. The oxygen atom in water has a large electronegativity associated with it due to the size of its nucleus in comparison to the hydrogen atom and the electrons from the two hydrogen atoms are drawn closer to the oxygen atom. This gives this end of the molecule a slight negative charge and the two hydrogen atoms then have a slight positive charge. The consequence of this distortion is that the water molecule acts like a small, weak magnet. The dipole feature of the water molecule allows the molecule to absorb the microwave radiation and starts it vibrating like a guitar string. The vibration of the bonds causes friction that turns to heat and then convects out into the irradiated material.

To take advantage of this feature of microwave radiation, a reaction chamber system described herein takes advantage of microwave irradiation and heating in processing feedstock that contains carbon and can be converted to transportation fuels. The reactor may be made from a substantially microwave transparent substance such as quartz, a glass-like material that is substantially transparent to microwave radiation. Because quartz can be manipulated into many shapes, it provides design discretion for shaping the reaction chamber, but in one example the reaction chamber is configured in the shape of a tube or cylinder. The cylindrical shape allows for the feedstock to feed in one end and exit at the opposite end. An example of a suitable reaction chamber would be a quartz tube that is about four feet (1.2 meters) long with a wall thickness of about 3⁄16 inch (4.8 mm).

The microwave reaction chamber is surrounded by a microwave reflective enclosure. This causes the microwave radiation to pass repeatedly through the reaction chamber and devolatize the organic-carbon-containing feedstock after the water, if present, is evaporated and driven off. The microwave reflective enclosure is any that reflects microwaves. Materials include, for example, sheet metal assembled as Faraday cages that are known to the art.

Microwave radiation is generated by a magnetron or other suitable device. One or more microwave producing devices, e.g., magnetrons can be mounted external to the quartz tube wall. Magnetrons come in different power ranges and can be controlled by computers to irradiate the processing feedstock with the proper energy to convert the feedstock to most desirable fuel products efficiently. In one application, the magnetron can be mounted on a cage that would rotate around the outside of the reactor tube as well as travel the length of the reactor tube. Feedstock traveling through the length of the inside of the tube will be traveling in a plug flow configuration and can be irradiated by fixed and/or rotating magnetrons. A computer may be used to control the power and/or other parameters of the microwave radiation so that different feedstock, with different sizes and densities can be irradiated at different parameter settings specific to the feedstock and thus convert the feedstock more efficiently.

These configurations of a reactor will allow efficient processing of feedstocks, from relatively pure feedstock streams to mixed feedstock streams that include feedstocks of different densities, moisture contents, and chemical make up. Efficiencies can occur because the fuel products are extracted from the reactor chamber as they are vaporized from the feedstock, but further processing of the remaining feedstock occurs until different fuel products are vaporized and extracted. For example, dense feedstock, such as plastics, take longer to process into a useable fuel than less dense feedstock, such as foam or wood chips. The system described herein continues to process dense feedstock without over-processing the earlier converted products from the less dense feedstock. This is accomplished by using both stationary and rotating microwave generators.

One example of a mixed feedstock would be unsorted municipal solid waste. In some implementations, catalyst may be added in the feedstock which helps in the conversion of the feedstock as well as the speed at which the conversion can progress. A catalyst can be designed to react at the preset processing temperature inside the reactor or to react with the impinging microwave radiation. In some embodiments, no catalyst is required. In other embodiments, the catalyst may be a rationally designed catalyst for a specific feedstock.

The plug flow configuration with the reactors described herein will allow adjustments to the residence time that the feedstock resides within the reactor core for more efficient exposure to the heat and the radiation of the microwaves to produce the desired end products.

Inlets and/or outlets, e.g., quartz inlets and/or outlets can be placed along the walls of the reaction chamber to allow for pressure and/or vacuum control. The inlets and outlets may allow the introduction of inert gases, reactive gases and/or the extraction of product gases.

Thus, the design of the microwave-transparent reaction chamber, the use of microwaves as a heating and radiation source with fixed and/or rotating magnetrons, plug flow processing control, with or without the use of catalysts, will allow the processing of any organic-carbon-containing feedstock.

A system in accordance with embodiments of the invention includes a reaction chamber having one or more substantially microwave-transparent walls and a microwave heating/radiation system. The microwave heating/radiation system is arranged so that microwaves generated by the heating/radiation system are directed through the substantially microwave-transparent walls of the reaction chamber and into the reaction cavity where the feedstock material is reacted without substantially heating the walls of the reaction chamber. To enhance the temperature uniformity of the feedstock, the reaction chamber and the heating/radiation system may be in relative motion, e.g., relative rotational and/or translational motion. In some implementations, the heating system may rotate around a stationary reaction chamber. In some implementations, the feedstock within the reaction chamber may rotate by the use of flights with the heating/radiation system remaining stationary. In some implementations, the reaction chamber may rotate with the heating system remaining stationary. In yet other implementations, both the reaction chamber and the heating/radiation system may rotate, e.g., in countercurrent, opposing directions. To further increase temperature uniformity, the system may include a mechanism for stirring and/or mixing the feedstock material within the reaction chamber. The reaction chamber may be tilted during reaction process, for example, to force the feedstock to go through the catalytic bed.

Figure 1C:
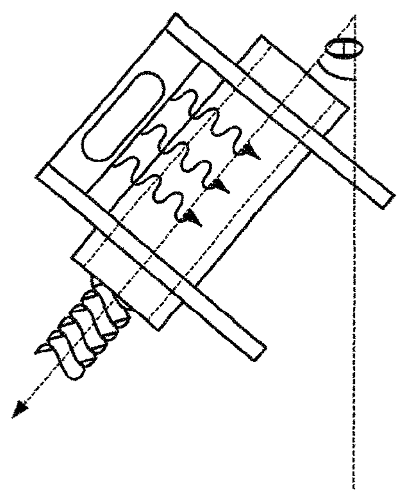
FIG. 1C is a diagram of a tilted reaction chamber system in accordance with embodiments of the invention.
Figure 1B:
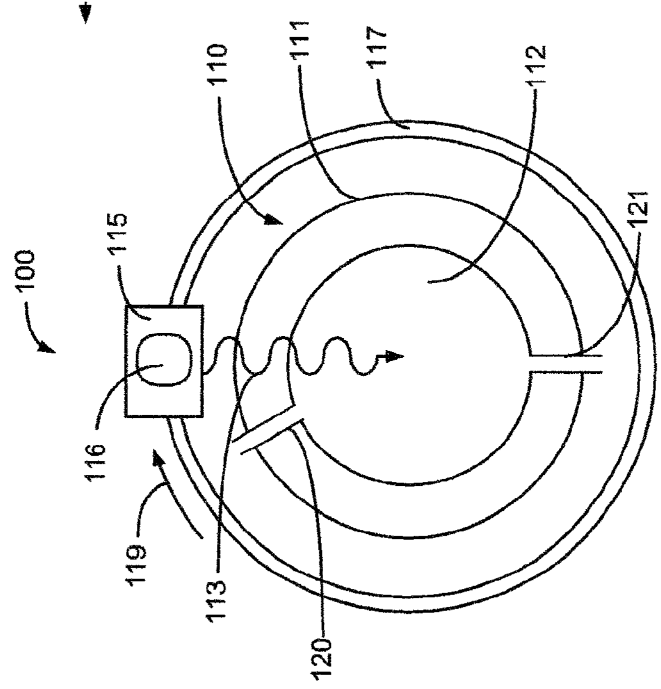

FIGS. 1A and 1B illustrate side and cross sectional views, respectively, of a system 100 for converting organic-carbon-containing feedstock to liquid fuel and char in accordance with embodiments of the invention. Although the reaction chamber 110 may be any suitable shape, the reaction chamber 110 is illustrated in FIGS. 1A and 1B as a cylinder having a cylindrical wall 111 that is substantially transparent to microwaves in the frequency range and energy used for the reaction process. The reaction chamber 110 includes a reaction cavity 112 enclosed by the cylindrical wall 111. The system 100 includes a transport mechanism 118 configured to move the feedstock through the reaction chamber. The operation of the system 100 with regard to the reactions taking place within the reaction chamber 110 may be modeled similarly to that of a plug flow reactor.

As illustrated in FIG. 1A, system includes a transport mechanism 118 for moving the feedstock material through the reaction chamber 110. The transport mechanism 118 is illustrated as a screw auger, although other suitable mechanisms, e.g., conveyer, may also be used. The transport mechanism 118 may further provide for mixing the feedstock within the reaction chamber. In some embodiments, the reaction chamber wall 111 may have a thickness of about 3⁄16 inch (4.8 millimeters). The smoothness of the reaction chamber wall 111 facilitates the movement of the feedstock through the reaction chamber 110.

A heating/radiation subsystem 115 may include any type of heating and/or radiation sources, but preferably includes a microwave generator 116 such as a magnetron which is configured to emit microwaves 113 having a frequency and energy sufficient to heat the organic-carbon-containing feedstock to a temperature sufficient to facilitate the desired reaction of the feedstock, for example, for depolymerization of the feedstock, microwaves in a frequency range of about 0.3 GHz to about 300 GHz may be used. For example, the operating power of the magnetrons may be in the range of about 1 Watt to 500 kilowatts. The magnetron 116 is positioned in relation to the reaction chamber 110 so that the microwaves 113 are directed through the wall 111 of the reaction chamber 110 and into the reaction cavity 112 to heat and irradiate the material therein. A mechanism 117 provides relative motion between the magnetron 116 and the reaction chamber 110 along and/or around the longitudinal axis 120 of the reaction chamber 110. In some embodiments, the mechanism 117 may facilitate tilting the reaction chamber 110 and/or the magnetron 116 at an angle θ (FIG. 1C) to facilitate the reaction of the feedstock and/or the extraction of gases, for example. In the embodiment illustrated in FIGS. 1A-C, the magnetron 116 is positioned on a rotational mechanism 117, such as a rotatable cage or drum that rotates the magnetron 116 around the stationary reaction chamber 110. In some implementations, the rotation around the chamber may not be complete, but the rotation path may define an arc around the circumference of the reaction chamber. The rotation may occur back and forth along the path of the arc. As previously mentioned, in some embodiments, the reaction chamber 110 may be the rotating component, or both the heating/radiation subsystem 116 and the reaction chamber 110 may rotate, e.g., in opposing, countercurrent directions. The rotation between the reaction chamber and the magnetron provides more even heating and more even microwave exposure of the feedstock within the reaction cavity 112, thus enhancing the efficient reaction chemistry of the feedstock and/or other processes that are temperature/radiation dependent, such as removal of water from the feedstock. The rotation lessens the temperature gradient and/or maintains a more constant microwave flux across the plug inside the reaction chamber.

The reaction chamber 110 may include one or more entry ports 120, e.g., quartz entry ports, configured to allow the injection or extraction of substances into or out of the reaction cavity 112. The reaction chamber 110 is also surrounded by a microwave-reflective enclosure 122. In one implementation, the quartz ports may be used to extract air and/or oxygen from the reaction cavity. Extraction of air and/or oxygen may be used to suppress combustion which is desirable for some processes.

For example, in certain embodiments, the system 100 may be used to preprocess the feedstock through compression and/or removal of air and/or water. In this application, gases such as hydrogen and/or nitrogen may be injected through one or more ports 120 to hydrogenate and/or suppress combustion of the feedstock. The reaction chamber 110 may also include one or more exit ports 121, e.g., quartz exit ports, configured to allow passage of water, water vapor, air, oxygen and/or other substances and/or by-products from the reaction chamber 110.

Figure 1D:
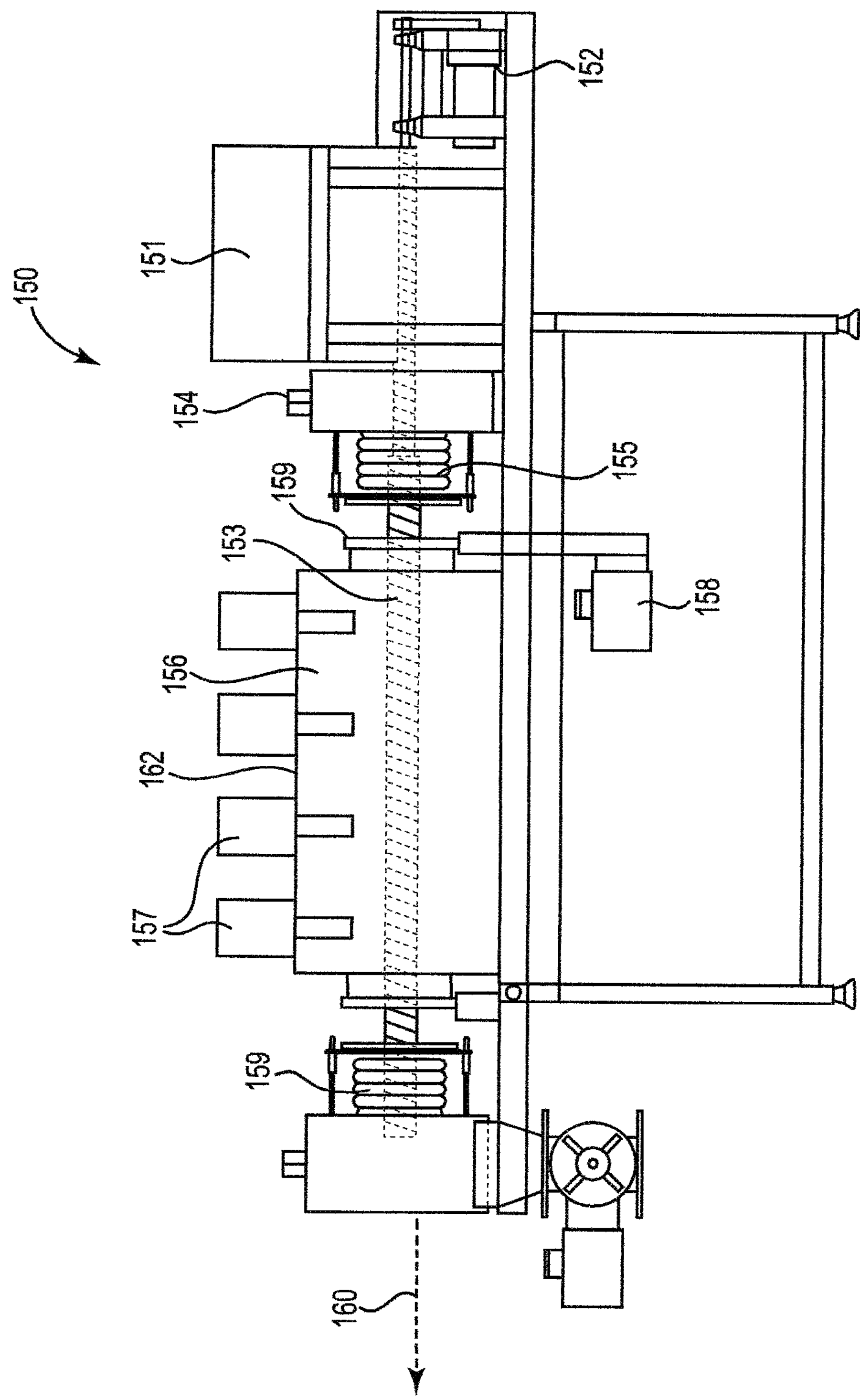
FIG. 1D is a diagram of a side view of a reaction chamber system in accordance with embodiments of the invention.

FIG. 1D is a diagram illustrating a reaction chamber system 150 for producing fuel from organic-carbon-containing feedstock in accordance with embodiments of the invention. The system 150 includes an input hopper (also referred to as a load hopper) 151 configured to allow introduction of the feedstock material into the system 150. A gearmotor auger drive 152 provides a drive system for the auger 153 that transports the feedstock through the system 150. As the feedstock is compressed in the load hopper 151, air is extracted through the atmosphere outlet 154. A seal 155 isolates the load hopper 151 from the reaction chamber 156 to maintain a level of vacuum. The reaction chamber 156 includes walls of a microwave-transparent material. One or more stationary microwave heads 157 are positioned at the walls of the reaction chamber 156. In addition, the system 150 includes one or more rotating microwave heads 158. In one implementation, each rotating microwave head is located at a fixed position with respect the longitudinal axis 160 of the reaction chamber 156. The rotating microwave head is mounted on a slipring bearing 159 which allows the microwave head 158 to rotate around the reaction chamber 156. A microwave reflective enclosure 162 encompasses the reaction chamber 156. In some implementations the rotating microwave head(s) 158 may rotate around the longitudinal axis 160 of the reaction chamber 156 as well as moving back and forth along the longitudinal axis 160. The system 150 includes a seal at the exit of the reaction chamber 156 to maintain the reaction chamber vacuum.

Figure 2A:
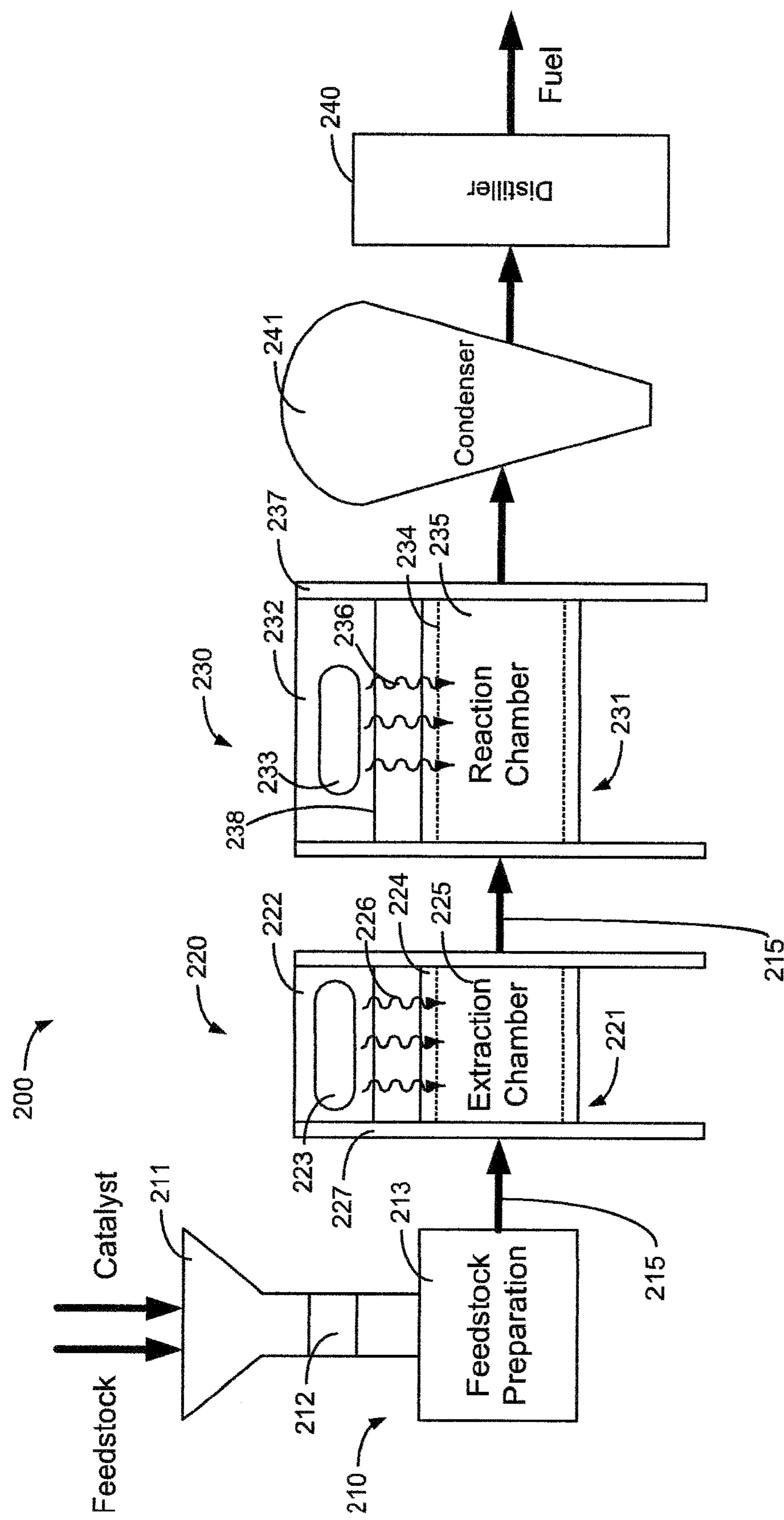
FIG. 2A is a block diagram of a system that uses the reaction chamber systems illustrated in FIGS. 1A and 1B for water/air extraction and a reaction process in accordance with embodiments of the invention.
Figure 2B:
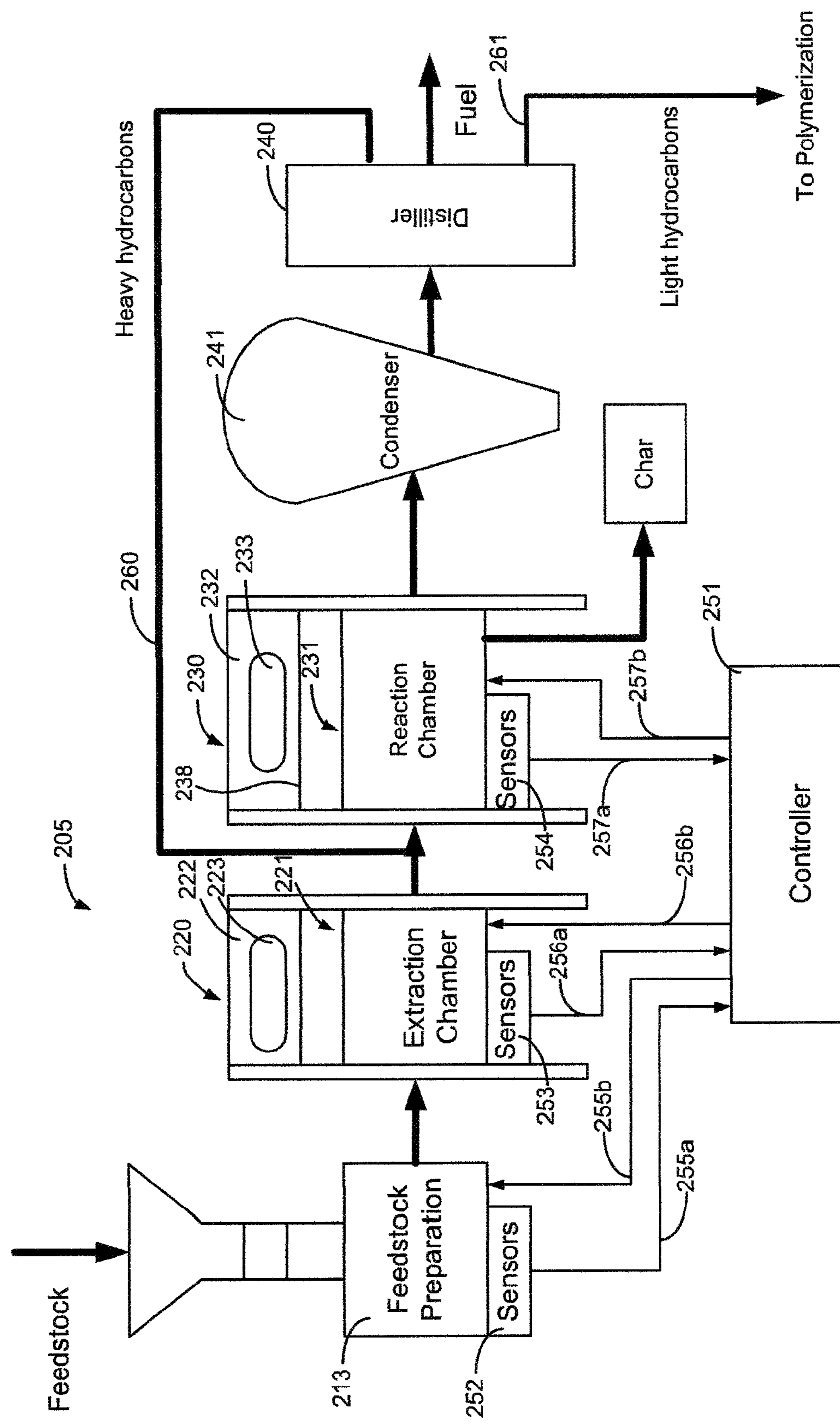
FIG. 2B illustrates a reaction system that includes feedback control in accordance with embodiments of the invention.

FIG. 2A is a block diagram of a system 200 that uses one or more of the reaction chamber systems 100 illustrated in FIGS. 1A and 1B. The reaction chamber systems 220, 230 may be arranged and/or operated in series or in a parallel configuration. The extraction process 220 and the reaction process 230 depicted in FIGS. 2A and 2B are illustrated as occurring in two separate reaction chambers, e.g., that operate at different temperatures. Alternatively, the extraction process and the reaction process may be implemented in a single reaction chamber with two separate zones, e.g., two separate temperature zones.

In the system 200 of FIG. 2, one or both of the water/air extraction subsystem 220 and the reaction subsystem 230 may be similar to the reaction chamber system 100 of FIGS. 1A and 1B. Organic-carbon-containing feedstock, such as, for example, one or more of manure, wood chips, plant-based cellulose, tire crumbs, municipal solid waste, plastic, crude oil, peat and coal, enters the system through a hopper 211, and traverses an airlock 212 to enter a feedstock preparation module 213. If needed, a catalyst, such as zeolite, and/or other additives that enhance the reaction process, for example to adjust the pH, may be introduced into the system 200 through the input hopper 211 and/or the entry ports (shown in FIG. 1B). In the feedstock preparation module 213, the feedstock material is shredded to a predetermined particle size that may be dependent on the properties of the feedstock, such as the purity, density, and/or chemical composition of the feedstock. If used, the catalyst may be added at the time that the feedstock is being prepared so that the catalyst is evenly dispersed within the feedstock material before entering the reaction chamber 231. In general, the less uniform the feedstock, the smaller the particle size needed to provide efficient reaction.

After the initial feedstock preparation stage, the shredded and mixed feedstock is transported by a transport mechanism 215 into the extraction chamber 221 of the next stage of the process. The air/water extraction subsystem 220, which performs the optional processes of water and/or air extraction prior to the reaction process includes a heating/radiation module 222 comprising at least a magnetron 223 configured to generate microwaves 226 that may be mounted on a rotational or stationary mechanism 227. If mounted on a rotational mechanism, the mechanism rotates the magnetron 223 either partially or fully around the extraction chamber 221 as the microwaves 226 are directed through the wall 224 of the extraction chamber 221 and into the extraction cavity 225 impinging on and heating the feedstock therein. In some embodiments, the heating module 222 may utilize only one magnetron 223 or only two or more magnetrons without using other heat/radiation sources.

In some embodiments, the heating/radiation module 222 may utilize the magnetron 223 in addition to other heat sources, such as heat sources that rely on thermal conduction through the wall of the reaction chamber, e.g., flame, steam, electrical resistive heating, recycled heat from the process, and/or other heat sources. During the air and/or water extraction process, the feedstock may be heated to at least 100 C, the boiling point of water, to remove excess water from the feedstock. The excess water (e.g., in the form of steam) and/or other substances may exit the extraction chamber 221 via one or more exit ports. Additives to the feedstock, such as inert and/or reactive gases including hydrogen and/or nitrogen, may be introduced via one or more input ports into the extraction chamber 221 of the water/air extraction process. In addition to being heated and irradiated by microwaves, the feedstock may also be subjected to a pressurized atmosphere and/or a vacuum atmosphere and/or may be mechanically compressed to remove air from the extraction chamber 221.

After the optional air and/or water extraction process, the transport mechanism 215 moves the feedstock to the next processing stage 230 which involves the reaction process, e.g., thermal depolymerization, of the feedstock. After the feedstock/catalyst mixture enters the reaction chamber 231 surrounded by the microwave reflecting enclosure 238, the mixture is heated to a temperature that is sufficient to facilitate the desired reaction. For example a temperature of in a range of about 200 C to about 350 C is used to crack the hydrocarbons in the feedstock into shorter chains to produce liquid fuel through depolymerization. In addition to being heated, the feedstock may also be subjected to a pressurized atmosphere or a vacuum atmosphere, and/or may be mechanically compressed in the reaction chamber 231.

In some embodiments, heating/radiation in the reaction chamber 231 is accomplished using a magnetron 233 emitting microwaves 236. The magnetron 233 may rotate relative to the reaction chamber 231. As previously described in connection with the water extraction stage 220, the rotating magnetron 233 may be supported by rotational mechanism 237, such as a cage or drum. The rotational mechanism 237 allows relative rotational motion between the magnetron 233 and the reaction chamber 231. For example, the magnetron 233 may rotate completely around the reaction chamber 231 or the rotation of the magnetron 233 may proceed back and forth along an arc that follows the circumference of the reaction chamber 231. The rotating magnetron heating system 233 may be supplemented using a stationary magnetron, and/or other conventional heat sources such as a flame or electrical resistive heating. Rotating the magnetron 233 provides more even heating/radiation of the feedstock material and catalyst within the reaction cavity 235 and enhances the heating properties over that of stationary heat sources.

The cracked hydrocarbons vaporize and are collected in a condenser 241 and liquefy and then are sent to the distiller 240 to produce the diesel fuel, while heavier, longer chain hydrocarbon molecules may be recycled back to the reaction chamber. In some implementations, distillation may not be necessary, and the fuel product only needs to be filtered.

In some configurations, it is desirable to control the processes of the reaction to allow a higher efficiency of fuel extraction from the feedstock. FIG. 2B is a block diagram of a system 205 that includes the system components described in connection with FIG. 2A along with a feedback control system 250. The illustrated feedback control system 250 includes a controller 251 and one or more sensors 252, 253, 254 which may be configured to sense parameters at various stages during the process. The feedback control system 250 may include sensors 252 at the feedstock preparation stage which are configured to sense parameters of the feedstock and/or feedstock preparation process. For example, the sensors 252, may sense the chemical composition of the feedstock, density, moisture content, particle size, energy content or other feedstock parameters. The sensors 252 may additionally or alternatively sense the conditions within the feedstock preparation chamber, e.g., flow, pressure, temperature, humidity, composition of the gases present in the chamber, etc. The sensors 252 develop signals 255*a* which are input to the controller electronics 251 where they are analyzed to determine the condition of the feedstock and/or the feedstock preparation process. In response to the sensed signals 255*a*, the controller 251 develops feedback signals 255*b* which control the operation of the feedstock preparation module 213. For example, in some implementations, the controller 251 may control the feedstock preparation module 213 to continue to shred and/or grind the feedstock material until a predetermined particle size and/or a predetermined particle size variation is detected. In another example, based on the sensed chemical composition of the feedstock, the controller 251 may cause a greater or lesser amount of catalyst to be mixed with the feedstock or may cause different types of catalyst to be mixed with the feedstock.

The control system 250 may also develop feedback signals 256*b*, 257*b* to control the operation of the water extraction module 220 and/or the reaction module 230, respectively, based on sensed signals 256*a*, 257*a*. For example, the sensors 253, 254 may sense the temperature of the water extraction and/or reaction processes and the controller 251 may develop feedback signals 256*b*, 257*b* to control the operation of the heating/radiation systems 222, 232, e.g., power, frequency, pulse width, rotational or translational velocity, etc. of one or both of the magnetrons 223, 233. The controller 251 may develop feedback signals to the magnetrons to control the amount of radiation impinging on the feedstock so that the feedstock will not be over-cooked or under-cooked and development of hot spots will be avoided. The controller 250 may control the injection of various substances into one or both of the extraction chamber and/or the reaction chamber 221, 231 through the entry ports to control the processes taking place within the chambers 221, 231. Char, the residue of the depleted feedstock, is sent to a storage unit. In some embodiments, the controller 250 may be used to control conditions that beneficially affect the properties of the char where specific properties are desired beyond that resulting just from the feedstock choice. After the distillation stage, the heavy hydrocarbons may be recycled back into the reaction chamber and the lighter hydrocarbons may be sent on to a polymerization stage.

Figure 3A:
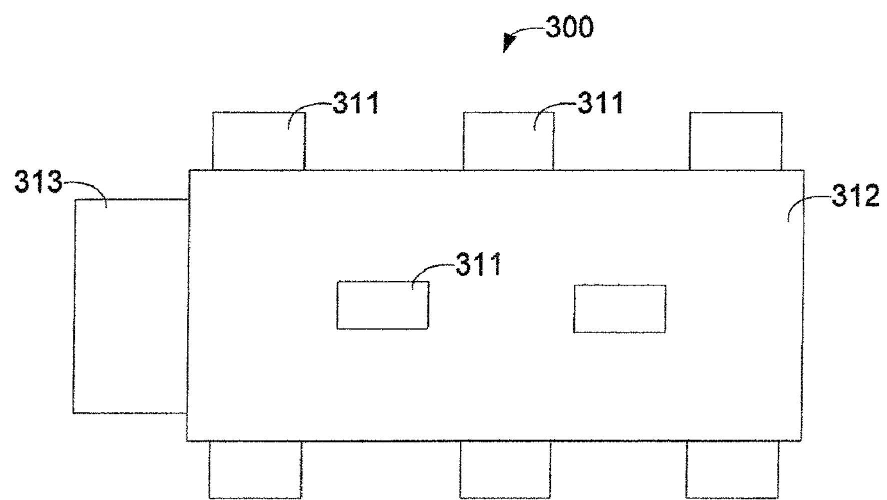
FIG. 3A shows system which includes multiple stationary magnetrons arranged on a drum that is disposed outside a cylindrical reaction chamber having one or more microwave-transparent walls.
Figure 3B:
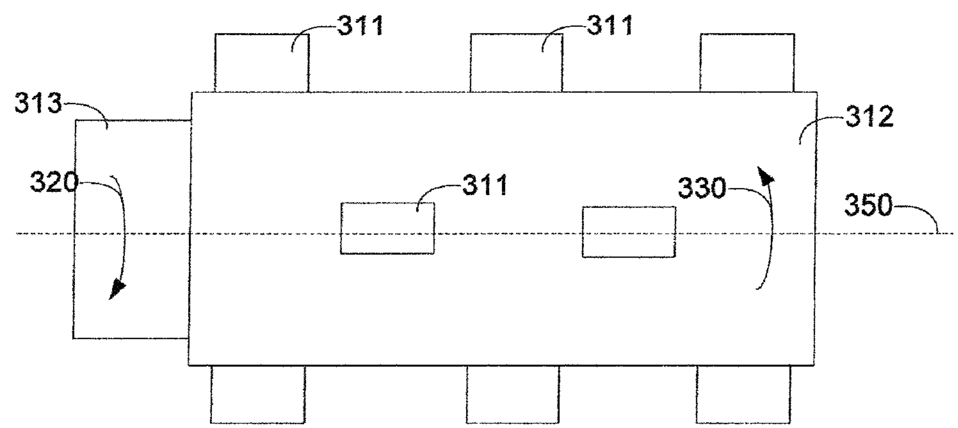
FIG. 3B illustrates a system having a drum supporting magnetrons which may be rotated around the longitudinal axis of the reaction chamber while the reaction chamber is concurrently rotated around its longitudinal axis.

The reaction chambers may be made of quartz, glass, ceramic, plastic, and/or any other suitable material that is substantially transparent to microwaves in the frequency and energy range of the reaction processes. In some configurations, the heating/radiation systems described herein may include one or more magnetrons that rotate relative to the reaction chamber. In some embodiments, the magnetrons may be multiple and/or may be stationary. FIG. 3A illustrates system 300 which includes multiple stationary magnetrons 311 arranged on a drum 312 that acts as a Faraday cage and is disposed outside a cylindrical reaction chamber 313 having one or more microwave-transparent walls. In system 300, the drums made of a material that is microwave opaque, such as, for example, metal, so as to cause the microwaves in the reaction chamber 313 to reflect back and forth through the feedstock, thus more efficiently being used to convert the feedstock into fuel and char. The operation of the magnetrons may be continuous, or may be pulsed, e.g., in a multiplexed pattern. In some embodiments (FIG. 3B), the drum 313 supporting the magnetrons 311 may be rotated 330 around the longitudinal axis 350 of the reaction chamber 312 and/or the reaction chamber 312 may be rotated 320 around its longitudinal axis 350.

Figure 3C:
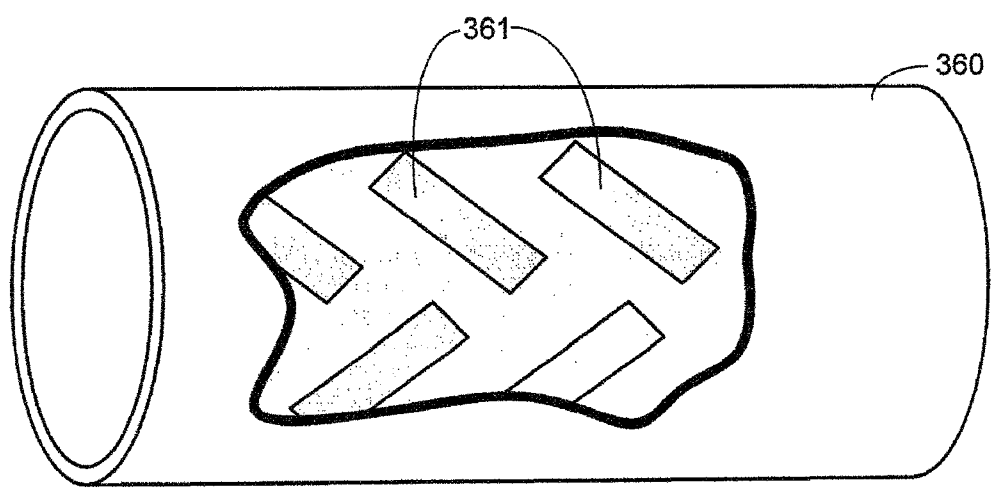
FIG. 3C shows a reaction chamber with a feedstock transport mechanism comprising baffles.

A feedstock transport mechanism may be disposed within the reaction chamber. For example, as illustrated in FIG. 3C, the feedstock transport mechanism may comprise one or more baffles 361 that are configured to move the feedstock through the reaction chamber 360 as the reaction chamber rotates. The baffles 361 may be mounted to the walls of the reaction chamber 360 and/or may be otherwise installed within the reaction chamber to provide movement of feedstock within and through the reaction chamber 360, e.g., longitudinally through the reaction chamber.

Figure 4:
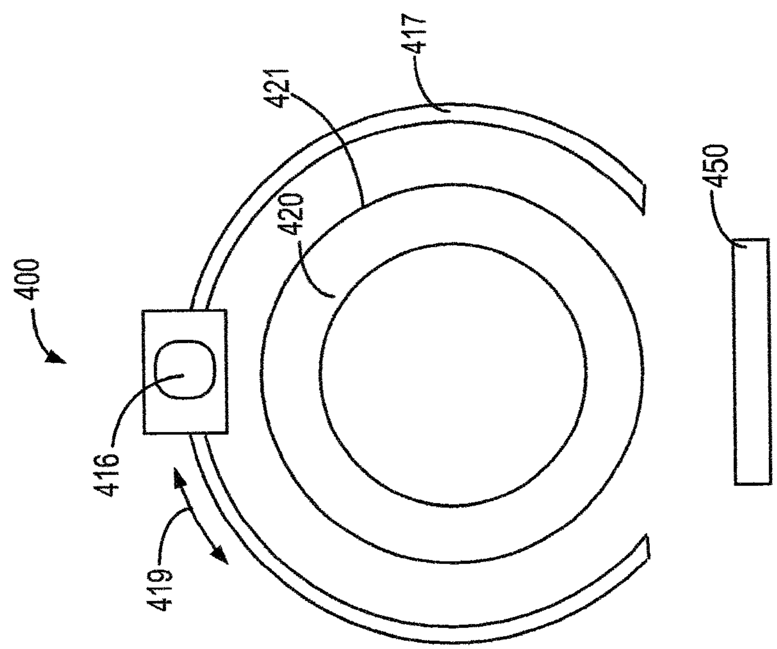
FIG. 4 illustrates a system having a rotating magnetron in addition to a secondary heat source.

In some embodiments, illustrated in FIG. 4, one or more secondary heat sources 450, such as a flame, steam, and/or electric resistive heating, or recycled heat, may be used in addition to magnetrons 416 which are stationary, or are supported on a mechanism 417 that rotates around the circumference of the reaction chamber 420 enclosed in a microwave-reflecting Faraday cage 421. In some configurations, the magnetrons 416 may not make a complete revolution around the reaction chamber 420, but may rotate back and forth 419 along an arc that follows the circumference of the reaction chamber 420. Various configurations are possible as long as the feedstock is exposed to substantially uniform heat throughout the mass of the feedstock particles to form char having pore density, distribution, and variance in size and distribution as described above for char of the invention.

Figure 5:
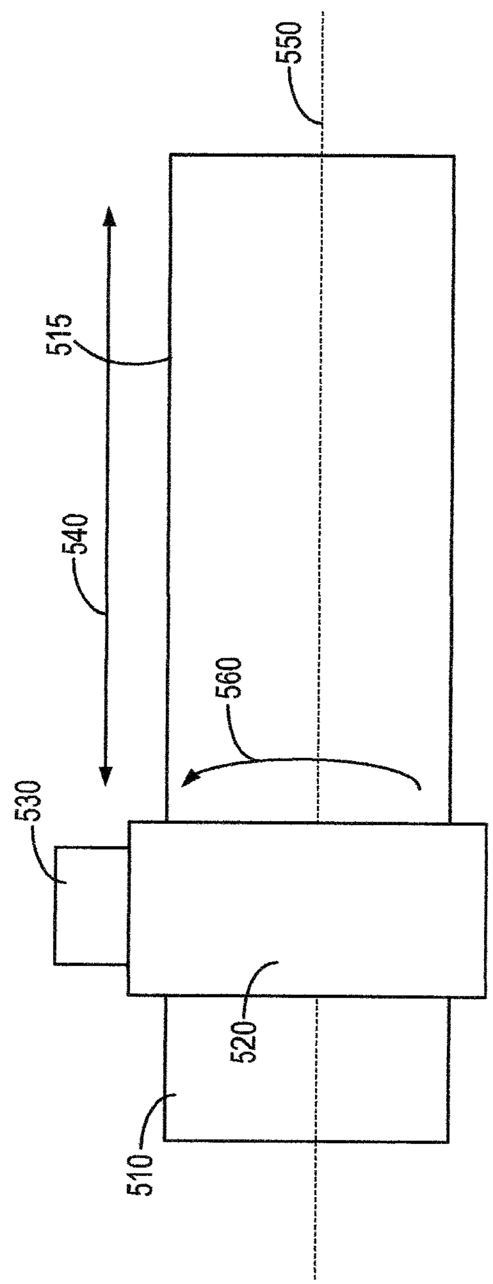
FIG. 5 depicts a system wherein a magnetron is moved along the longitudinal axis of the reaction chamber and is rotated around the longitudinal axis of the reaction chamber.

Movement of the one or more magnetrons relative to the reaction chamber may also include motion that moves the magnetron along the longitudinal axis of the reaction chamber, as illustrated in FIG. 5. FIG. 5 illustrates a reaction chamber 510 and a cage 520 that supports a magnetron 530. The cage 520 and magnetron 530 may be moved 540 back and forth along the longitudinal axis 550 of the reaction chamber 510 and over a metal microwave-reflecting Faraday cage 515 enclosing the reaction chamber 510. In some implementations, in addition to and/or concurrent with the motion 540 of the cage 520 and magnetron 530 along the longitudinal axis 550, the cage 520, and magnetron 530 may be rotated 560 around the longitudinal axis 550.

Figure 6:
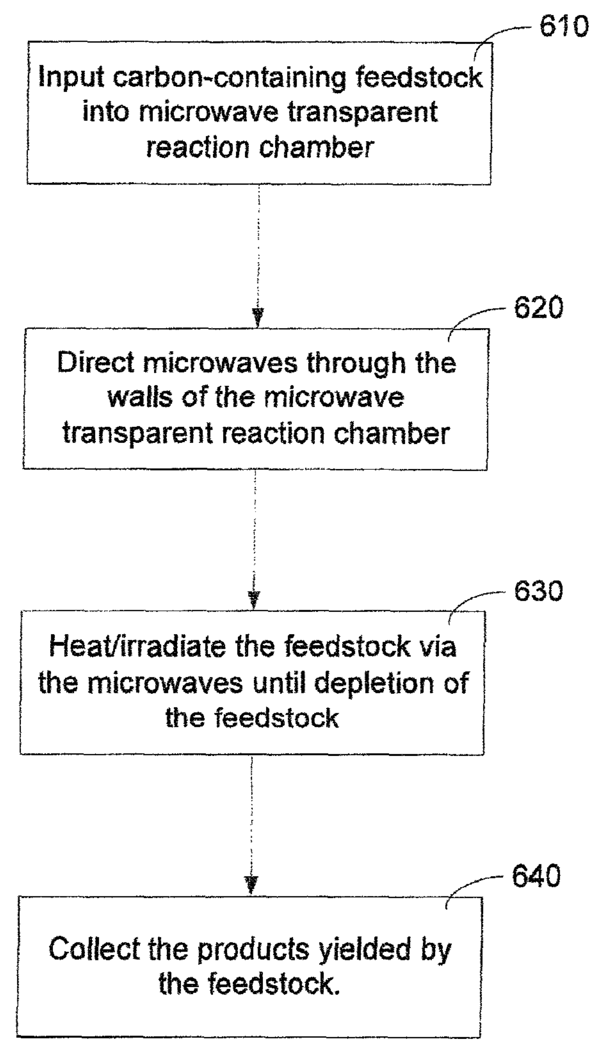
FIG. 6 is a flow diagram of a process for generating fuel from organic-carbon-containing feedstock in accordance with embodiments of the invention.

FIG. 6 is a flow chart illustrating a process for producing fuel from an organic-carbon-containing feedstock in accordance with embodiments of the invention. An organic-carbon-containing feedstock, such as biomass, municipal solid waste, plant material, wood chips, and the like is input 610 to a reaction chamber having walls that are substantially transparent to microwaves used to heat and/or irradiate the feedstock. The feedstock may be a solid or a suspension that contains solid elements. The heating and/or radiation occur by directing 620 the microwave energy through the walls of the reaction chamber so that it impinges on the feedstock disposed within the reaction chamber. The feedstock is heated/irradiated 630 by the microwaves, optionally in the presence of a catalyst, until reaction of the organic-carbon-containing molecules occurs to produce the desirable end fuel product. The fuel product created by the reaction processes are collected 640.

Various modifications and additions can be made to the preferred embodiments discussed hereinabove without departing from the scope of the present invention. Accordingly, the scope of the present invention should not be limited by the particular embodiments described above, but should be defined only by the claims set forth below and equivalents thereof.

What is claimed is:

1. A char composition made using a process for converting an organic-carbon-containing feedstock mixture to the char composition, the process comprising:

inputting the organic-carbon-containing feedstock mixture into a substantially microwave-transparent reaction chamber containing no externally supplied oxygen and within a microwave reflective enclosure;

directing microwaves from a magnetron through walls of the reaction chamber to impinge on the feedstock mixture;

rotating the magnetron around the reaction chamber;

microwaving the feedstock mixture until the feedstock reacts to produce the char composition, wherein the feedstock mixture comprises animal or plant material that is renewable in less than 50 years.

2. The char composition of claim 1, further comprising pores having a number of pores per volume that is at least 10 percent more than would have been in a char made with the same feedstock but using a thermal process that creates a liquid phase during the process.

3. The char composition of claim 1 further comprising pores that have a variance in pore distribution of less than 10 percent.

4. The char composition of claim 1, wherein a number of pores per volume that is at least 20 percent more than would have been in a char made with the same feedstock but using a thermal process that creates a liquid phase during the process.

5. The char composition of claim 1, wherein a number of pores per volume that is at least 30 percent more than would have been in a char made with the same feedstock but using a thermal process that creates a liquid phase during the process.

6. The char composition of claim 1, wherein a number of pores per volume that is at least 40 percent more than would have been in a char made with the same feedstock but using a thermal process that creates a liquid phase during the process.

7. The char composition of claim 1, further comprising a heat content of at least 20% more than the heat content in a char made with the same feedstock but using a thermal process that creates a liquid phase during the process.

8. The char composition of claim 1, wherein the organic-carbon-containing feedstock comprises at least 5 weight percent water.

9. The char composition of claim 1, wherein the organic-carbon-containing feedstock comprises at least 5 weight percent volatiles.

10. The char composition of claim 1, wherein the organic-carbon-containing feedstock comprises non-renewable hydrocarbons.

* * * * *